(12) United States Patent
Medepalli et al.

(10) Patent No.: US 8,554,237 B2
(45) Date of Patent: *Oct. 8, 2013

(54) CHANNEL PARTITIONING FOR WIRELESS LOCAL AREA NETWORKS

(75) Inventors: Kamesh Medepalli, Sunnyvale, CA (US); David Famolari, Stewartsville, NJ (US); Praveen Gopalakrishnan, Somerville, NJ (US); Toshikazu Kodama, Morristown, NJ (US); Ryoko Matsuo, Tokyo (JP); Shunichi Obayashi, Fort Lee, NJ (US); Faramak Vakil, Bedminister, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/631,473

(22) Filed: Dec. 4, 2009

(65) Prior Publication Data

US 2010/0142465 A1 Jun. 10, 2010

Related U.S. Application Data

(62) Division of application No. 11/347,828, filed on Feb. 3, 2006, now Pat. No. 7,650,151.

(60) Provisional application No. 60/649,760, filed on Feb. 4, 2005.

(51) Int. Cl.
  *H04W 72/00* (2009.01)
(52) U.S. Cl.
  USPC .......................................................... 455/450

(58) Field of Classification Search
  USPC ................... 455/424, 425, 456.5, 456.6, 561, 455/550.1, 575.1, 450, 452.1, 453, 452.2, 455/434, 451, 454, 456.1, 456.2, 525, 524, 455/509, 513, 62, 552.1, 67.13, 154.1, 278.1; 370/232, 431, 395.4, 412, 395.21, 330, 335, 370/332, 337, 336, 437, 478, 230, 468, 322, 370/348, 390, 395.42, 395.43, 432, 433, 370/443, 462, 395.2; 375/220, 260
  See application file for complete search history.

(56) References Cited

U.S. PATENT DOCUMENTS 5,521,904 A * 5/1996 Eriksson et al. ............... 370/249
5,537,395 A * 7/1996 Alles et al. .................... 370/236

(Continued)

FOREIGN PATENT DOCUMENTS

JP   H11083256 A   3/1999
JP   2003052079 A   2/2003

(Continued)

OTHER PUBLICATIONS

CruzPerez et al., Electronics letters Jun. 24, 1999, vol. 35, No. 13, Title—"Handoff prioritization with implicit channel reservation in distributed dynamic channel assignment algorithm".*

(Continued)

*Primary Examiner* — Yuwen Pan
*Assistant Examiner* — Ankur Jain

(57) ABSTRACT

The present application discloses, inter alia, a system for improving the aggregate throughput of a wireless local area network which includes: at least one access point that is equipped with at least one transceiver configured to simultaneously transmit and receive at multiple frequencies using multiple channels; and the access point being configured to acquire channel conditions of users and to pool sets of users on the channels based on the channel conditions.

25 Claims, 8 Drawing Sheets

(56) References Cited

U.S. PATENT DOCUMENTS

| | | | |
|---|---|---|---|
| 5,570,306 A | 10/1996 | Soo | |
| 5,740,167 A * | 4/1998 | Taketsugu et al. | 370/337 |
| 6,078,568 A * | 6/2000 | Wright et al. | 370/312 |
| 6,131,031 A * | 10/2000 | Lober et al. | 455/444 |
| 6,259,922 B1 | 7/2001 | Benveniste | |
| 6,314,084 B1 * | 11/2001 | Kahale et al. | 370/230 |
| 6,452,964 B1 * | 9/2002 | Yoshida | 375/222 |
| 6,597,705 B1 * | 7/2003 | Rezaiifar et al. | 370/468 |
| 6,732,163 B1 | 5/2004 | Halasz | |
| 6,956,835 B2 * | 10/2005 | Tong et al. | 370/330 |
| 6,985,439 B2 | 1/2006 | Hosein | |
| 7,564,820 B2 * | 7/2009 | Subramanian et al. | 370/335 |
| 2003/0123425 A1 * | 7/2003 | Walton et al. | 370/341 |
| 2004/0121749 A1 * | 6/2004 | Cui et al. | 455/226.1 |
| 2004/0208183 A1 | 10/2004 | Balachandran et al. | |
| 2005/0041611 A1 | 2/2005 | Sandhu | |
| 2005/0085235 A1 * | 4/2005 | Park et al. | 455/450 |
| 2005/0101324 A1 * | 5/2005 | Chambers et al. | 455/435.3 |
| 2005/0129063 A1 | 6/2005 | Razoumov et al. | |
| 2006/0104232 A1 * | 5/2006 | Gidwani | 370/328 |
| 2006/0121946 A1 * | 6/2006 | Walton et al. | 455/561 |
| 2006/0146721 A1 | 7/2006 | Attar et al. | |
| 2006/0281412 A1 * | 12/2006 | Skafidas et al. | 455/63.1 |
| 2008/0037541 A1 | 2/2008 | Souissi et al. | |
| 2008/0107074 A1 * | 5/2008 | Salmenkaita et al. | 370/330 |

FOREIGN PATENT DOCUMENTS

| | | |
|---|---|---|
| JP | 2004-007652 A | 1/2004 |
| JP | WO2004006117 A1 | 1/2004 |

OTHER PUBLICATIONS

International Search Report dated Jun. 21, 2006.
Martin Heusse, Performance Anomaly of 802.llb, p. 1-12, LSR-IMAG Laboratory, Grenoble, France.
Terms of Use for IEEE Standards Publications Delivered in Electronic Form, p. 1-3, IEEE 802 Program, USA.
Godrey Tan, Time-Based Fairness Improves Performances in Mult-Rate WLANs, 2004, p. 22-23, USENIX Association, USA.
Jungmin So, Multi-Channel MAC for Ad Hoc Networks: Handling Multi-Channel Hidden Terminals Using A Single Transceiver, p. 1-17, USA.
P. Viswanath, Opportunistic Beamforming Using Dumb Antennas, Jun. 2002, p. 1277-1294, vol. 48, Issue 6, USA.
IEEE Standards Association, p. 1, Website, IEEE 802, USA.
Cruz-Perez et al., Electronics Letters Jun. 24, 1996, vol. 35, No. 13, title—Handoff prioritization with implicit channel reservation in distributed dynamic channel assignment algorithm.
Japanese Office Action (with summary translation).
Japanese Office Action dated Oct. 20, 2010, issued in corresponding Japanese patent application No. 2007-509760.
Communication pursuant to Article 94(3) dated Jul. 9, 2010, issued in corresponding European Application No. 06713427.0.
European Office Action dated Sep. 4, 2012, issued in corresponding European Patent Application No. 06713427.0 (3 pages).

* cited by examiner

FIG. 10

| Parameter | Value | | | |
|---|---|---|---|---|
| | 802.11b | 802.11a | 802.11g only | 802.11g + legacy |
| SLOT | 20 μs | 9 μs | 9 μs | 20 μs |
| SIFS | 10 μs | 16 μs | 10 μs | 10 μs |
| DIFS (SIFS + 2xSLOT) | 50 μs | 34 μs | 28 μs | 50 μs |
| EIFS(SIFS+K+Preamble+PLCP+DIFS) K=8xACK/Min_Mand_Rate | 364 μs | 90 μs | 8 μs | 192 μs |
| Preamble Length | 144μs, long 72μs, short | 20 μs | 20 μs | 20 μs |
| Min Mandatory Data Rate [Mb/s] | 1 | 6 | 6 | 1 |
| PLCP Header Length | 48μs,long 24μs,short | 4 μs | 4 μs | 4 μs |
| RTS Size (Bytes) | 20 | 20 | 20 | 20 |
| CTS Size (Bytes) | 14 | 14 | 14 | 14 |
| ACK Packet Size (Bytes) | 14 | 14 | 14 | 14 |
| CWmin (units of SLOT) | 31 | 15 | 15 | 15 |
| CWmax (units of SLOT) | 1023 | 1023 | 1023 | 1023 |
| Signal Extension | N/A | N/A | 6 μs | 6 μs |

Table 1 Summary of important constants in 802.11b, 802.11a and 802.11g

CHANNEL PARTITIONING FOR WIRELESS LOCAL AREA NETWORKS

The present application claims priority under 35 U.S.C. 119 to U.S. provisional application Ser. No. 60/649,760 entitled Optimal Channel Assignment For Multi-Class, Multi-Channel Wireless Lans And The Like, the entire disclosure of which is incorporated herein by reference.

BACKGROUND

1. Field of the Invention

The present application relates to wireless communications, and some preferred embodiments relate more specifically to systems and methods for maximizing aggregate system throughput and performance of a wireless local area network (WLAN).

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Some Limitations of Existing Wireless Systems

This section sets forth certain knowledge of the present inventors, and does not necessarily represent knowledge in the art.

Wireless networks, and, in particular Wireless Local Area Networks (WLANs), such as, e.g., IEEE 802.11 based WLANs have been experiencing a remarkable growth and usage increases. For example, 802.11b or Wi-Fi systems can be seen in offices, residences and hot spots, ad hoc networking test beds, to name a few examples. Moreover, 802.11a and the relatively new 802.11g standards provide higher data rates (e.g., up to 54 Mb/s) than 802.11b (e.g., up to 11 Mb/s). Additionally, with the shrinking costs of WLAN chipsets, it is becoming easier for notebook computer vendors to provide WLAN devices that are compatible with all these three standards under 802.11.

Accordingly, investigating performance enhancements to these and other different WLAN systems is of increasing value. One of the major drawbacks of current WLAN systems is that all users time share the channel; there is no inherent capability to maintain simultaneous data transmissions. This is a consequence of all terminals associated with an AP sharing the same frequency, code and space. Moreover, the CSMA/CA protocol used for medium access in 802.11 DCF (Distributed Coordination Function) has been designed to provide long term fairness to all users in the sense that all users have the same probability of obtaining access to the medium, regardless of differences in their channel data rate. If the traffic being generated is identical for all users, they all achieve substantially the same long term throughput as well. Hence, the achievable throughput is limited by users having the lowest transmission rate.

The background work related hereto includes, inter alia, works that address the long term fairness of CSMA/CA protocol. See, e.g., the below-listed references [2, 6]. With reference to Heusse et. al., reference [2], this reference considers an 802.11b WLAN and shows that different users with different data rates achieve the same long term throughput that is significantly lower than what a high data rate user could have obtained. For example, two UDP users each with 11 Mb/s channel obtain a throughput of approximately 3 Mb/s each. However, if one user is at 1 Mb/s and the other at 11 Mb/s, they both obtain a throughput of 0.7 Mb/s. This phenomenon is also called throughput based fairness of 802.11. See, e.g., the below-listed reference [6]. With reference to Tan and Guttag, reference [6], this reference presents a method based on time based fairness to provide equal channel time to all stations. Such equal time allocation to different users is akin to that achieved by the Proportional Fair scheduling scheme proposed in the IS-856 3G cellular system. See, e.g., the below-listed reference [9]. Allocating equal time to users has the result of users achieving throughput proportional to their channel rate. In addition, the performance analysis of 802.11 DCF by Bianchi, see reference [17], provides a useful analytical model that has been modified, Heusse et. al., to address infrastructure mode WLANs.

Additionally, the provision of multiple channels in the context of cellular systems has been well studied. In that regard, the concept of frequency reuse is essentially synonymous with cellular systems. See, e.g., the below reference [11]. In addition, techniques such as dynamic channel allocation, see reference [10], are well known. Moreover, the use of multiple channels in the context of ad hoc networks has also received appreciable attention. There, the primary aspects studied in the context of ad hoc networks include, e.g., connectivity and maximizing spatial reuse. The connectivity aspects include, e.g., routing and medium access control, and include the multiple-channel hidden terminal problem where by two neighboring nodes are agnostic to each other's transmissions when they operate at different frequencies. The below-listed recent works by So and Vaidya, see reference [7], and by Raniwala et. al., see reference [18], help to summarize some background developments in multi-channel ad hoc networks.

While a variety of systems and methods are known, there remains a need for improved systems and methods which overcome one or more of the following and/or other limitations.

REFERENCES

[1] ITU Recommendation P.59, "Artificial Conversational Speech," March 1993

[2] M. Heusse, F. Rousseau, G. Berger-Sabbatel, A. Duda, "Performance Anomaly of 802.11b," Proc. of INFOCOM 2003.

[3] K. Medepalli, P. Gopalakrishnan, D. Famolari and T. Kodama, "Voice Capacity of IEEE 802.11b, 802.11a and 802.11g WLAN Systems," To appear: Proc. of IEEE GLOBECOM 2004.

[4] IEEE 802.11b specification, 1999, Available at: http://standards.ieee.org/getieee802/download/802.11b1999.pdf

[5] IEEE 802.11a specification, 1999, Available at: http://standards.ieee.org/getieee802/download/802.11a-1999.pdf

[6] G. Tan and J. Guttag, "Time-based Fairness Improves Performance in Multi-rate WLANs," Proc. of USENIX 2004.

[7] J. So and N. Vaidya, "Multi-Channel MAC for Ad Hoc Networks: Handling Multi-Channel Hidden Terminals Using A Single Transceiver," Proc. of ACM MobiHoc 2004.

[8] L. Kleinrock and F. A. Tobagi, "Packet Switching in Radio Channels: Part I—Carrier Sense Multiple Access and their Throughput-Delay Characteristics," IEEE Transactions on Communications, Vol. 23, Issue: 13, December 1975, pp. 1417-1433.

[9] P. Viswanath, D. Tse and R. Laroia, "Opportunistic beamforming using dumb antennas," IEEE Transactions on Information Theory, vol. 48(6), June 2002.

[10] I. Katzela and M. Naghshineh, "Channel assignment schemes for cellular mobile telecommunication systems: A comprehensive survey," IEEE Personal Comm., pp. 10-31, June 1996.

[11] T. S. Rappaport, "Wireless Communications: Principles & Practice," Prentice Hall, 2002.

[12] F. A. Tobagi and L. Kleinrock, "Packet Switching in Radio Channels: Part II—the Hidden Terminal Problem in Carrier Sense Multiple-Access and the Busy-Tone Solution," IEEE Trans on Comm, December 1975, pp. 1417-1433.

[13] S. Boyd and L. Vandenberghe, "Convex Optimization," Cambridge University Press, 2003.

[14] A. Bykadorov, "On quasiconvexity in fractional programming,"—In: "Generalized Convexity," S. Komlosi, T. Rapcsak, S. Schaible (Eds.)/Proceedings Pecs (Hungary), 1992: Lecture Notes in Economics and Mathematical Systems, no. 405, Springer-Verlag, Berlin—Heidelberg—New York, 1994, p. 281-293.

[15] A. Caprara, H. Kellerer, U. Pferschy, "The Multiple subsets sum problem," SIAM Journal on Optimization, Vol. 11, No. 2, pp. 308-319, 2000.

[16] C. Koksal et. al., "An analysis of short-term fairness in wireless media access protocols," in Proceedings of ACM SIGMETRICS, 2000.

[17] G. Bianchi, "Performance analysis of the IEEE 802.11 Distributed Coordination Function," JSAC Wireless Series, vol. 18, no. 3, 2000.

[18] A Raniwala., K. Gopalan and T. Chieuh, "Centralized Algorithms for Multi-channel Wireless Mesh Networks," ACM Mobile Computing and Communications Review (MC2R), vol. 8, no. 2, April 2004.

[19] IEEE 802.11g-2003, Available at http://standards.ieee.org/getieee802/download/802.11g-2003.pdf.

SUMMARY OF THE PREFERRED EMBODIMENTS

The preferred embodiments of the present invention can significantly improve upon existing methods and/or apparatuses.

According to some of the preferred embodiments, an additional dimension of orthogonality can be used to potentially segregate users with strongest channel conditions from those users with weakest channels, resulting in overall performance improvements.

In the preferred embodiments, a system is provided that establishes concurrent use of multiple orthogonal channels as an advantageous method for providing the additional dimension of orthogonality.

Among other things, the preferred embodiments can achieve significant gains from using multiple channels. For example, as discussed below at Section IV, it can be seen that in a multi-channel WLAN with C channels, appropriate channel allocation can lead to an increase in aggregate throughput that is more than C times the single channel throughput (e.g., super-linear gains are possible).

The IEEE 802.11b standard, see reference [4] above, specified 14 channels operating in the 2.4 GHz frequency band with the channel numbers 1, 6 and 11 being the three non-overlapping channels. In the case of IEEE 802.11a, see reference [5] above, all of the 12 channels defined in the standard (i.e., 8 in the lower to middle U-NII band and 4 in the upper U-NII bands) can be used in overlapping and/or adjacent cells. With respect to 802.11g, see reference [19] above, because it was designed for the 2.4 GHz ISM band, it also has 3 non-overlapping channels.

However, it should be noted that although present standards compliant WLANs do support such multiple channels, they use only one of the multiple channels in a static manner. In such cases, each WLAN Access Point (AP) operates on only one channel. In such cases, the choice of the channel to operate on depends on the deployment scenario. For example, residential users pay little attention, if any, towards specifying the channel to be used by their WLAN Access Point (AP). This is often actually the case in some businesses, offices, campuses, and other professional environments. In some more carefully planned deployments, the channel to be used is determined by accounting for propagation characteristics and the resulting mutual interference between APs. Thus, such present day devices only need to employ a single radio equipped with channel changing capability.

On the other hand, in the preferred embodiments of the present invention each AP is equipped with transceivers capable of simultaneously transmitting and receiving at multiple frequencies. However, the terminals still preferably use a single radio with the ability to change the operating frequency in a dynamic manner.

In this disclosure, the problem of optimally assigning carriers (i.e. frequencies) in WLANs, while meeting the QoS requirements of all users admitted, is considered. Among other things, the present disclosure helps to demonstrate the following notable concepts. First, it is shown that the problem of optimal channel allocation can be formulated and solved as a convex optimization problem. Second, it is demonstrated that a proposed heuristic algorithm based on pooling users with similar channel conditions can be used as a means of approximating optimal policy. Third, the benefits of optimal channel allocation are quantified and it is demonstrated that the proposed heuristic algorithm can achieve near optimal performance in terms of minimizing the call blocking probability. As seen below, the analyses and results not only address the major WLAN standards of IEEE 802.11b, 802.11a and 802.11g, but they extend further, such as, e.g., considering the useful case of 802.11b and 802.11g co-existence. Prior to the present invention, others had not appreciated the desirability of such a study addressing these sets of problems.

According to some embodiments of the invention, a system for improving the aggregate throughput of a wireless local area network is provided that includes: at least one access point that is equipped with at least one transceiver configured to simultaneously transmit and receive at multiple frequencies using multiple channels; the access point being configured to acquire channel conditions of users and to pool sets of users on the channels based on the channel conditions. In this disclosure, the language "at least one access point that is equipped with at least one transceiver configured to simultaneously transmit and receive at multiple frequencies using multiple channels" encompasses, among other things, situations in which an AP has one transceiver that can simultaneously transmit and receive and also situations in which an AP has two or more transceivers to simultaneously transmit and receive. In some embodiments, the at least one access point has a single radio that is configured to dynamically change the operating frequency. In preferred embodiments, the access point is configured to assign users to channels based upon a heuristic algorithm, and, preferably, based upon a PACK algorithm. In some embodiments, the system includes user terminals configured for at least two different networking specifications, and wherein users for a first of the networking specifications are placed on a first channel and users for a second of the networking specifications are placed on a second channel.

According to some other embodiments of the invention, a method for improving performance of a wireless local area network is performed that includes: a) having an access point simultaneously transmit and receive communications on multiple channels; and b) segregating users accessing the access point onto different ones of the channels based on differences in strengths of the users' channel conditions. In some embodiments, the method further includes having the access point change the operating frequency in a dynamic manner using a single radio. In some embodiments, the method further includes having the access point pool sets of users based on channel quality.

According to some other embodiments of the invention, a system for improving performance in wireless communications to an IP network is provided that includes: at least one access point that is equipped with at least one transceiver configured to simultaneously transmit and receive on multiple channels; wherein the access point is configured to pool users onto the channels based channel conditions. In some embodiments, the at least one access point is configured to respond to association requests from user stations configured to send or receive on only one of the channels at a given time, wherein the user stations are at differing locations and are capable of using different channel rates. In some embodiments, the access point is configured to enable voice traffic and/or packet data traffic. In some preferred embodiments, the access point is configured to assign users to channels based on a heuristic algorithm.

In some examples, the access point is configured to separate users into a number of classes of users having respective levels of throughput; when the users can be admitted, the access point is configured to allocate the users to the channels as follows: on each channel, the access point allocates as many users from a respective class as possible, when the number of users in the respective class is less than the channel capacity for that class, there is no spill-over traffic of calls, and all the users in the respective class are allocated to that channel; when the number of users in a class is more than the channel capacity for that class, there is spill-over traffic of calls, which calls are further assigned by the access point going through the classes in a step-wise manner starting at a higher throughput class so as to pair spill-over traffic having a higher throughput with that having a lower throughput.

In some embodiments, the access point is configured to separate users into a number of classes of users with different levels of throughput; if the access point cannot accommodate all users, then the access point is configured to allocate users by going through user classes in a step-wise manner starting at a higher throughput first class, assigning as many of such users as possible, then moving onto a next class and then to subsequent classes.

In some embodiments, wherein the access point is configured to handle asynchronous calls by admitting only users with similar channel conditions onto corresponding ones of the channels. Yet, in some other embodiments, in circumstances in which the access point receives external interference related to the presence of additional access points, the access point is configured to gauge the utilization of each of the channels and to establish a subset of the channels to be chosen. In some other embodiments, the access point is configured to maintain a moving window average of the channel load activity on each of the channels.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 10 is a table depicting an illustrative summary of notable constants in 802.11b, 802.11a and 802.11g;

DETAILED DESCRIPTION OF THE PREFERRED EMBODIMENTS

Figure 1:
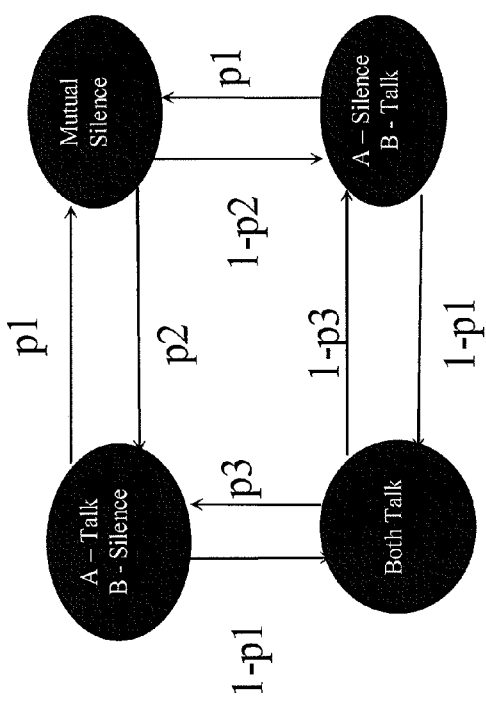
FIG. 1 is a schematic diagram depicting conversational speech modeled as a four (4) state Markov Chain, $p1=0.4$, $p2=p3=0.5$.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

1. INTRODUCTION TO THE PREFERRED EMBODIMENTS

As wireless LANs gain increasing popularity, it has become important to understand their performance under different application scenarios and to investigate the various means by which their performance can be improved. The present inventors have determined that one of the potential performance enhancing features is the concurrent use of multiple orthogonal channels. Nevertheless, in contrast to single channel WLANs, WLANs supporting multiple channels and multiple classes of user traffic (such as, e.g. voice, data, etc.), face the problem of resource (e.g., channel) allocation.

In the preferred embodiments, the problem of optimally assigning incoming calls to one of the channels while maintaining the QoS requirements of individual calls can be cast as a constrained optimization problem. In preferred embodiments, minimizing the call blocking probability and maximizing aggregate system throughput are two objective functions of interest.

Preferably, an easy heuristic algorithm (referred to herein as PACK) which groups users with similar channel gains and traffic characteristics onto the same channel is employed. Notably, this can achieve near optimal performance for each of the three major WLAN systems: IEEE 802.11b; 802.11a; and 802.11g. For the case of different voice users with different channel conditions, a 60% increase in throughput can be achieved for the 802.11b system. In addition, as demonstrated below, an increase in call blocking probability by as much as 75% can be incurred if such pooling is not performed. As further demonstrated below, grouping users can yield cascaded benefits for, e.g., cases where 802.11g terminals co-exist with 802.11b terminals. In such cases, 802.11g terminals can be placed on channels different from those used by 802.11b terminals. Among other things, this can, thus, allow implementers to do away with throughput reducing protection schemes such as CTS-to-self and RTS-CTS. As further demonstrated below, the optimal scheme can be implemented in a distributed and adaptive manner when more than a single AP is deployed in a geographical area.

In the sections, further details regarding the preferred embodiments are set forth. Then, an analytical framework for capacity analysis on single AP using single channel is introduced. Then, motivation for the use of concurrent channels is provided and the framework is extended to formulate the problem of channel allocation in an AP using multiple channels. And then, channel allocation in the case when multiple APs share a geographical area is addressed and numerical results are provided quantifying the performance of channel assignment strategies.

2. ILLUSTRATIVE SYSTEM MODEL

Figure 11A:
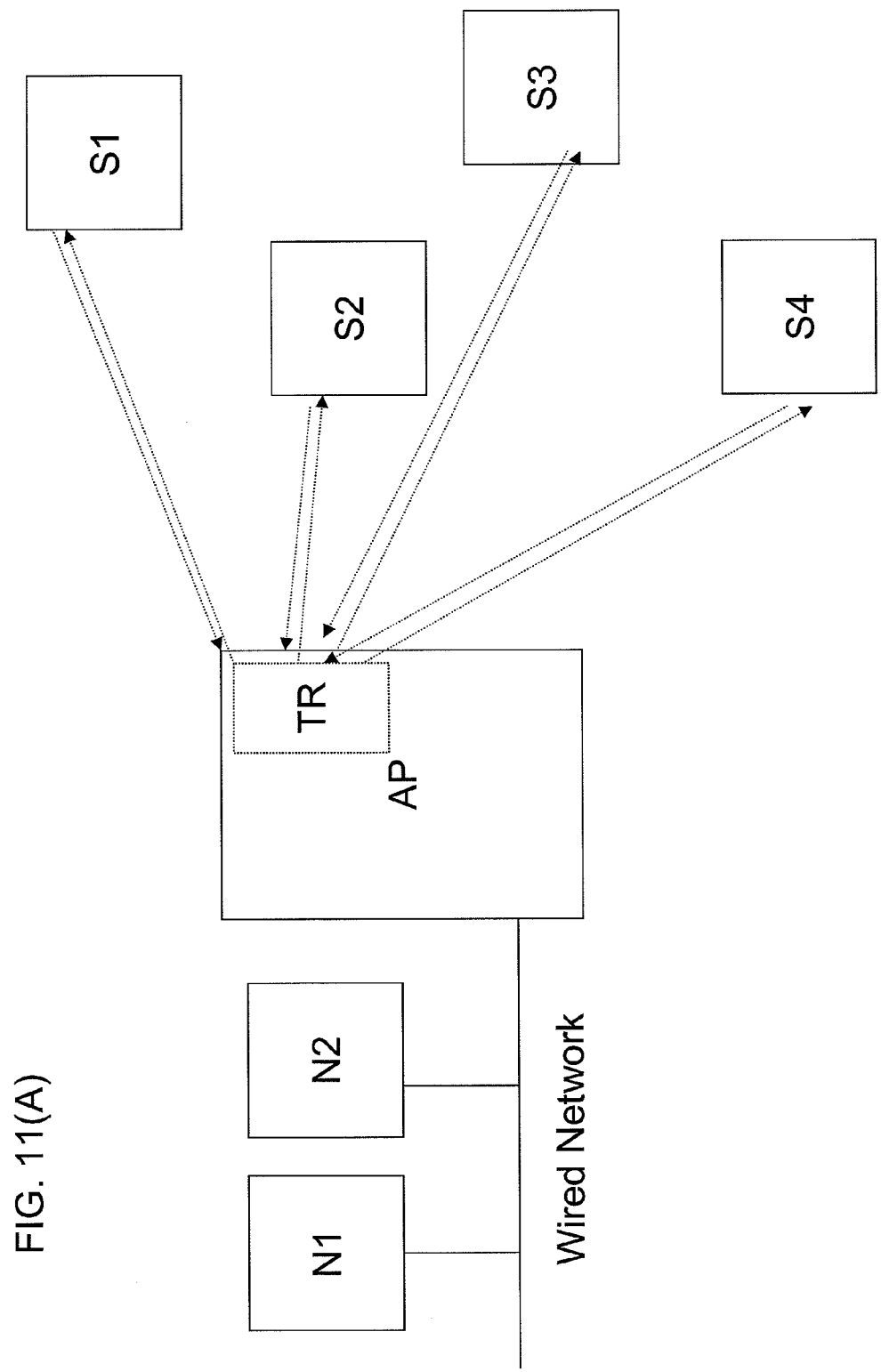
FIG. 11(A) is an architectural diagram showing a plurality of stations communicating wirelessly via an access point that is connected to a wired network as an illustrative and non-limiting example.
Figure 11B:
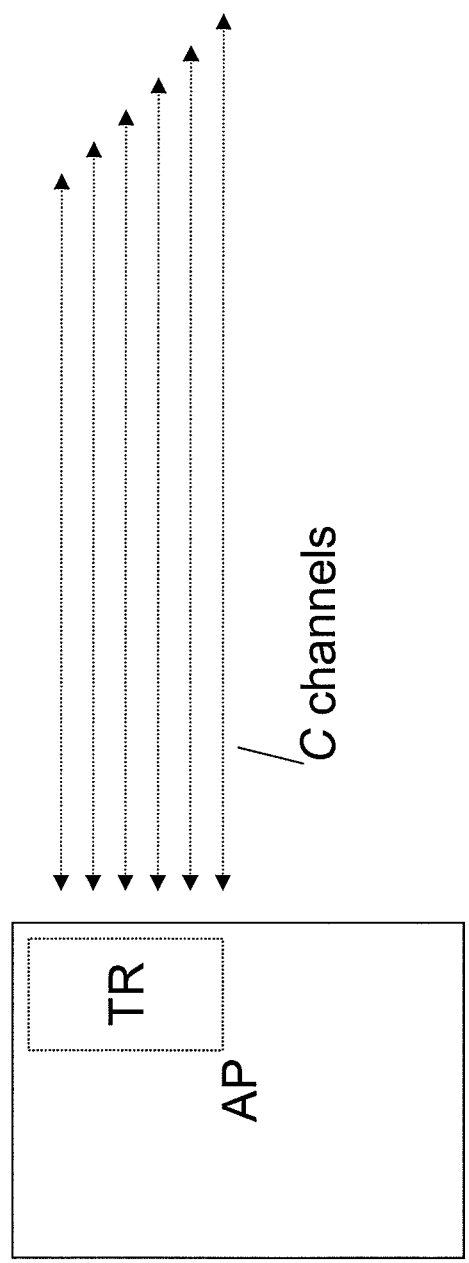
FIG. 11(B) is an architectural diagram showing access point having a transceiver communicating over a plurality of channels according to some illustrative embodiments.

With reference to FIGS. 11(A) and 11(B), in some illustrative and non-limiting examples, an infrastructure based on, e.g., a 802.11 WLAN where at least one AP has access to C orthogonal frequency carriers. The AP is assumed to be equipped with a full-duplex transceiver TR—i.e., it has the capability of simultaneously transmitting and receiving on each of the C channels, as depicted in FIG. 11(B), at the same time. On each channel, the AP performs normal 802.11 operations such as sending beacons, responding to association messages from stations, etc. The stations S1-S4 are assumed to be similar to existing half-duplex 802.11 devices, whereby they can send or receive on only one of the C channels at any given time. Users within an 802.11 Basic Service Set (BSS), e.g., within the cell, are generally assumed to be at different distances from the AP. Thus, different users may be using different channel rates.

In various embodiments, users can be running any appropriate application on the WLAN. However, the AP is preferably assumed to be aware of the application traffic description. Using this information, the AP can estimate the resources needed for the i-th user, $\lambda_i$, and uses it to determine whether or not to admit a user, and if it admits the user, onto which channel the user should be admitted. Although some embodiments may include multiple interfering APs, as discussed below, in many embodiments, and as described in more detail herein, a stand-alone AP supporting multiple channels and, e.g., voice over WLAN is employed. In case of voice traffic, in some illustrative embodiments as shown in FIG. 11(A), the stations are assumed to be in conversation with, e.g., nodes N1, N2, etc., in a wired network.

a. Voice Traffic Model

We use the ITU recommendation for generating conversational speech, as specified in recommendation P.59. See, e.g., reference [1] above. The voice codec used is the G.711 codec which generates voice packets at a rate of 64 Kb/s. We assume there are zero delays incurred in the wired part of the system and ignore all propagation delays. A notable feature of the P.59 recommendation is that it models the conversation between two users A and B as a four state Markov chain (of the Markov probability analysis technique) with states being: (a) A talking, B silent, (b) A silent, B talking, (c) both talking, (d) both silent. This is depicted in FIG. 1. In some examples, the durations of states are mutually independent and identically distributed exponential random variables with means 854 ms, 854 ms, 226 ms and 456 ms, respectively. In demonstrative studies by the present inventors, it was assumed that voice packets are generated only when a user is in the talking state. That is, a simplified assumption of silence suppression was rendered in which no voice packets are generated when a user is silent.

In FIG. 1, conversational speech is modeled as a 4 state Markov Chain, wherein $p1=0.4$, $p2=p3=0.5$.

b. Protocol Layers and Headers

In an example considering a codec packetization interval of 10 ms, the raw voice packet is 80 bytes. In such cases, the headers are composed of 28 bytes for MAC, 20 bytes for UDP, 8 bytes for IP and 12 bytes for RTP. In some examples, no other header is added to increase the packet size; however, a physical layer header (192 μs for 802.11b, 20 μs for 802.11a and an additional 6 μs for 802.11g) is incurred for every packet transmission.

c. MAC Layer Description

The 802.11 MAC specification defines two modes for medium access: the centrally coordinated PCF (Point Coordination Function) and the distributed access scheme DCF. Unlike DCF, the PCF mode is specified as an option by the standard. Moreover, it is seldom implemented in commercially available WLAN devices because of the additional complexity involved in AP controlling channel access. The DCF on the other hand is governed by a "listen-before-talk" protocol, essentially known as CSMA (Carrier Sense Multiple Access). See, e.g., reference [8] above. In such cases, every station that needs to send a packet first senses the channel for at least a duration of DIFS (Distributed Inter Frame Spacing). If the channel is sensed idle, the station chooses a random back-off counter value uniformly distributed in the range of [0, CW], where CW stands for contention window. The contention window is maintained in units of SLOT and is initially set to CWmin. Once the back-off counter value is chosen, it is decremented by one for each slot the channel is sensed idle. If the channel is sensed busy before the counter reaches zero, the decrementing process is frozen and is resumed only when the channel is sensed idle for a DIFS period again. After transmission, the sender expects to receive an acknowledgement (ACK) within a SIFS (Short Inter Frame Spacing) period. If an ACK is not received, the packet is assumed to be lost. Each time a packet is lost (such as, e.g., either due to collision or to channel errors), the contention window is doubled until the maximum value of CWmax is reached. In addition, before the next packet is sent, the channel is sensed for a duration of EIFS (Extended Interframe Spacing) and not DIFS. The station makes limited attempts to retransmit a packet, as specified by the RETRY_LIMIT parameter. Upon successful transmission of a packet, the CW is reset to CWmin.

It is possible that two stations that are not within transmission range of each other can cause collisions at neighboring nodes due to the well known hidden terminal problem. See, e.g., reference [12] above. The standard specifies RTS (Request-To-Send) and CTS (Clear-To-Send) message exchanges to reduce these occurrences. To simplify analyses, it can be assumed all stations are within radio range of each other and, hence, one can dispense with RTS/CTS cycles as appropriate.

FIG. 10 depicts a table, labeled Table 1, that summarizes notable constants related to the IEEE 802.11b, 802.11a and 802.11g systems. As for the 802.11g system, the following points are noted. While 802.11g operates in the same 2.4 GHz band as 802.11b, the 802.11b terminals cannot decode the OFDM modulated high rate 802.11g transmissions; hence, there can be an increased number of collisions. Here, the 802.11g standard specifies two mechanisms to minimize the cross-talk between high rate 802.11g users and low rate 802.11b users. These mechanisms are initiated as soon as a legacy 802.11b user registers with an 802.11g access point. The last column in the table shown in FIG. 10 reflects the changes induced in the several system variables. The first effect of legacy terminals is to increase the SLOT duration from 9 μs to 20 μs. The second effect is to introduce additional message exchange cycles at the MAC layer which promote peaceful co-existence between 802.11g and 802.11b users. In the following paragraphs, the two protection methods used at the MAC layer are described:

CTS-to-Self:

In this scheme, after the usual sensing time of DIFS and the random back-off time, the sender transmits a CTS message (with its own address) to inform all of the neighboring 802.11b nodes of an upcoming packet transmission. Following the CTS message, the sender waits for a SIFS duration and then transmits the payload packet and expects an ACK within the SIFS time as usual.

RTS-CTS Exchange:

If 802.11g terminals experience significant packet loss in spite of using the CTS-to-self procedure, they have the option of using the full RTS-CTS exchange cycle. Here again, after the initial channel sensing and random back-off, the station sends an RTS message and expects the CTS after a SIFS duration. Once the CTS packet is received, the payload packet is sent after a SIFS duration. This RTS/CTS exchange is the standard RTS/CTS exchange.

In both of these schemes, the CTS and RTS messages must be sent at a rate understood by all terminals. Thus, 11 Mb/s is the maximum rate for these packets. In addition, a long PLCP header needs to be used. Accordingly, the complete RTS/CTS cycle reduces the capacity of the 802.11g system beyond the CTS-to-Self cycle. It is noteworthy that once either mechanism is completed, the 802.11g terminals use almost the same 54 Mb/s OFDM physical layer as 802.11a terminals, except that there is a longer SLOT duration of 20 μs.

d. Physical Layer Model

The supported data rates are a function of the standard of interest. Accordingly, such are merely parameters in the inventor's studies. The quantitative results set forth below are for a highest physical rate supported. In that regard, IEEE 802.11b physical layer supports 1, 2, 5.5 and 11 Mb/s, all four of which are mandatory. In addition, IEEE 802.11a has an OFDM based physical layer and supports 6, 9, 12, 18, 24, 36, 48 and 54 Mb/s, of which 6, 12 and 24 Mb/s are mandatory. Moreover, IEEE 802.11g physical layer supports data rates of both 802.11b and 802.11a, of which the mandatory rates are 1, 2, 5.5, 11, 6, 12 and 24 Mb/s.

In the analyses below, it was assumed for simplicity that the devices are stationary and that the channel introduces no errors. However, packets can still be lost due to collisions. Moreover, it was also assumed for simplicity that all users inside a BSS are within range of each other and the AP.

3. SINGLE ACCESS POINT WITH A SINGLE CHANNEL

This section highlights, inter alia, how the throughput of a single carrier WLAN can be calculated. For illustration purposes, consider that the total number of voice and data users requesting service be V and D, respectively. We group the V voice users into M subgroups where all of the voice calls within a subgroup have substantially the same channel quality and vocoder profile. Preferably, the vocoder profile indicates the vocoder type (such as, e.g., G.711, G.723, etc.) and the packetization interval (such as, e.g., 10 ms, 20 ms, etc.). This information can readily be obtained by the AP by, e.g., parsing SIP (Session Initiation Protocol) signaling messages during the initiation of a voice call. Similarly, we can group the data users into N subgroups where all the data calls within a subgroup have the same channel quality. Note that in general, data calls are deemed as best effort so it is unlikely that data calls specify a traffic profile (such as, e.g., minimum data rate, maximum data rate, packet size; etc.). If such a profile is indeed specified, the subgroups are formed in such a way that traffic profiles are accounted for. The net effect of such subgroup division is that all users within a subgroup have substantially the same packet transmission time. Let us denote the average effective packet transmission time of the voice user in the i-th voice subgroup as $T_i^V$ and that of the data user in the i-th data subgroup as $T_i^D$. The effective transmission time here includes the actual transmission time of the user data plus the overhead time. Based on the description of 802.11 DCF above, the effective transmission time $\bar{T}$ can be computed using the effective time after n retransmissions, $T_n$ as:

$$T_n = (n+1)T_0 + \left\{\sum_{k=1}^{n} \min\{2^k CWmin, CWmax\}\right\} \times \frac{SLOT}{2} + n\left(EIFS - DIFS - CWmin \times \frac{SLOT}{2}\right)$$

$$T_0 = T_P + T_{Layers} + DIFS + SLOT \times \frac{CWmin}{2} + SIFS + T_{ACK}$$

$$T_0 = T_P + T_{Layers} + DIFS +$$
$$SLOT \times \frac{CWmin}{2} + \frac{8 \times CTS}{R} + T_{PHY} + 2 \times SIFS + T_{ACK}$$

$$T_0 = T_P + T_{Layers} + DIFS + SLOT \times \frac{CWmin}{2} +$$
$$\frac{8 \times (RTS + CTS)}{R} + 2 \times T_{PHY} + 3 \times SIFS + T_{ACK}$$

$$\bar{T} = \frac{1}{\sum_{n=0}^{N_{max}} P_{col}^n (1 - P_{col})} \sum_{n=0}^{N_{max}} T_n \times P_{col}^n (1 - P_{col})$$

The foregoing three different equations for $T_0$ are for (i) 802.11b, 802.11a and 802.11g only, (ii) 802.11g with CTS-to-self, and (iii) 802.11g with RTS-CTS, respectively. $P_{col}$ is the collision probability, taken to be independent from transmission to transmission, and is approximated to be 1/32 for 802.11b and 1/16 for 802.11a and 802.11g. $N_{max}$ is the maximum number of retransmissions. $T_P$ is the time required to transmit the raw voice packet. $T_{Layers}$ is the time taken for transmitting the RTP/UDP/IP/MAC/PHY header. $T_{ACK}$ is the time taken for transmitting the acknowledgement (ACK). And, D is the codec packetization interval in seconds. $T_i^V$ and $T_i^D$ are also computed using the expressions above, with the exception that the average data packet size is used for $T_i^D$ while the voice packet size is used for computing $T_i^V$. Now, since 802.11 DCF provides equal long term channel access probability for all contending nodes, the total cycle time for the above system can be given as (note: each node transmits one packet in during this cycle):

$$T = \sum_{i=1}^{M} a_i T_i^V + \sum_{i=1}^{N} p_i T_i^D$$

where $a_i$ and $p_i$ are the number of voice and data users in the i-th voice and data subgroups, respectively. If the user data packet size is $B_i^V$ and $B_i^D$ for the i-th voice and data subgroups, respectively, the corresponding throughput can be given as $$\frac{B_i^V}{T} \text{ and } \frac{B_i^D}{T},$$

respectively. Thus, the total aggregate system throughput on the given carrier can be given as:

$$S = \frac{\sum_{i=1}^{M} a_i B_i^V + \sum_{i=1}^{N} p_i B_i^D}{T} = \frac{\sum_{i=1}^{M} a_i B_i^V + \sum_{i=1}^{N} p_i B_i^D}{\sum_{i=1}^{M} a_i T_i^V + \sum_{i=1}^{N} p_i T_i^D}$$

Notably, in deriving the above, the long term throughput was focused on. Over short time scales (e.g. hundreds of milliseconds), 802.11 MAC is known to exhibit unfairness in that different users can achieve different throughput. See, e.g., reference [15] above. The notion of resources consumed by a call ($\lambda$) will be the metric used in admission control. Essentially, it indicates the fraction of time, the WLAN system is "dedicated" to a user. It was originally computed in the above-noted reference [3] where it was also shown to successfully predict the voice capacity of WLANs. In those analyses, a fundamental idea involved conditioning on each of the 4 states of the Markov chain and computing the state dependent effective transmission time. Roughly speaking, the product of number of packets generated per second and the time needed per packet gives $\lambda$. Based on that approach, the net resources consumed by voice and data calls can be identified as $$\sum_{i=1}^{M} a_i \lambda_i^V \text{ and } \sum_{i=1}^{N} p_i \lambda_i^D,$$

respectively. Thus, residual resources can be given as $$1 - \sum_{i=1}^{M} a_i \lambda_i^V - \sum_{i=1}^{N} p_i \lambda_i^D$$

and an incoming call with resource need of $\mu$ is admitted if $$\mu + \sum_{i=1}^{M} a_i \lambda_i^V + \sum_{i=1}^{N} p_i \lambda_i^D \leq 1.$$

Again, as indicated above, extension of this approach to include other traffic types is quite straightforward given, e.g., that an AP has reasonable knowledge of traffic characteristics.

4. SINGLE ACCESS POINT WITH MULTIPLE CHANNELS

In this section, we consider a single AP equipped with C carriers at its disposal. For illustration purposes, consider that users can either be voice users or packet data users. When a user requests access to a channel, the AP decides which channel to allocate to the user, should the user be admitted. For simplicity, let us first consider the problem of optimally assigning V voice calls and D data calls to the C carriers. It is obvious that such a problem is considered only for simplicity and not for modeling reality. In reality, calls usually come and leave in an asynchronous manner. Thus, the AP does not have the ability to assign channels to the users in one step. We describe later, how this approach of solving for the channel assignment with the knowledge of all users can help facilitate the solving of the channel assignment problem when calls arrive and depart asynchronously. In the following section, advantages of using multiple channels can be easily appreciated by the possibility of super-linear gains, such as, e.g., discussed below.

a. Gains from Using Multiple Channels

In order to appreciate the gains from using multiple channels, one may consider, by way of example, a simple WLAN system consisting of 3 users. Consider that all 3 of the users are sending data to the wired network using UDP and a packet size of 1500 Bytes. Let us further assume that the channel data rate of the first user is 11 Mb/s, of the second user is 5.5 Mb/s and of the third user is 1 Mb/s. Following the analysis in previous section, the average time needed for successfully transmitting one UDP packet is about 1.99 ms, 3.17 ms and 13.9 ms. In a single channel system, the three users time share, resulting in a throughput of $$\frac{1500 \times 8}{1.99 + 3.17 + 13.9} \approx 1.9 \text{ Mb/s}.$$

In a 3 channel system, each of these users can be placed on one channel each to achieve a throughput of 10.7 Mb/s. When there are 2 channels, the combination achieving the highest throughput is user 1 on channel 1 and the other two users on channel 2. The resulting throughput is 5.5 Mb/s.

Figure 2:
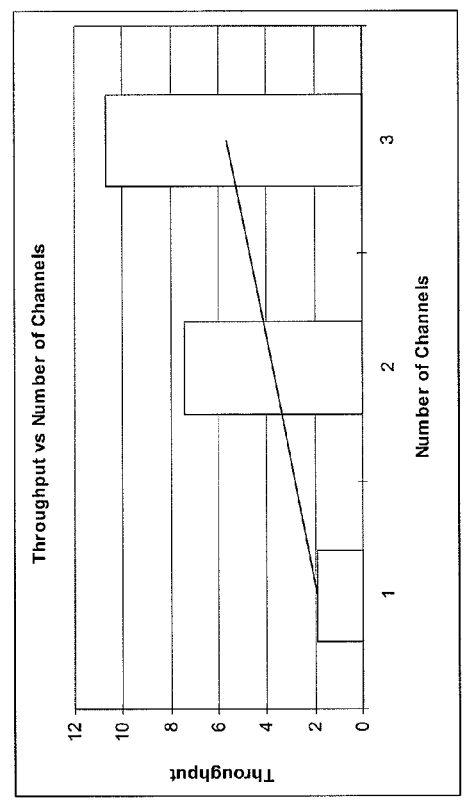
FIG. 2 is a chart depicting illustrative gains that can be achieved by using multiple channels.

FIG. 2 demonstrates illustrative gains that may be available from using multiple channels. In particular, FIG. 2 shows an aggregate throughput (e.g., bars) scales super-linearly, clearly providing motivation for the usage of multiple channels. Note that there are no such gains possible when all users are at the same data rate. However, in real-world environments, WLAN users experience different channel conditions, resulting in different channel rates. In such cases, multiple channels can provide significant improvements to system wide performance.

It should be noted that in the event that one considers this channel allocation for such 3 users to be uncomplicated, such should not be improperly extrapolated to the general case, especially when one considers other factors such as call blocking rate.

Accordingly, it should be apparent that this section, thus, provides further motivation for studies conducted by the present inventors.

b. Optimal Channel Allocation as a Linear Program

Extending the description in the previous section, let us denote $\alpha_{ij}$ as the number of users in the i-th voice subgroup that are assigned to the j-th frequency carrier. Similarly, $\beta_{ij}$ is the number of users in the i-th data subgroup that are assigned to the j-th frequency carrier. Following these definitions, we see that when all calls are admitted, then $$\sum_{j=1}^{C} \alpha_{ij} = a_i, \quad \sum_{j=1}^{C} \beta_{ij} = b_i,$$

$$\sum_{i=1}^{M} \sum_{j=1}^{C} \alpha_{ij} = \sum_{i=1}^{M} a_i = V$$

and $\sum_{i=1}^{N} \sum_{j=1}^{C} \beta_{ij} = \sum_{i=1}^{N} b_i = D.$

The goal of our problem is to find the values of $\alpha_{ij}$ and $\beta_{ij}$ such that maximum aggregate system throughput is achieved while meeting the QoS requirements of admitted users. Throughput on the j-th channel can now be given as:

$$S_j = \frac{\sum_{i=1}^{M} \alpha_{ij} B_{ij}^V + \sum_{i=1}^{N} \beta_{ij} B_{ij}^D}{T_j}$$

where, $B_{ij}^V$ ($B_{ij}^D$) are the packet sizes of the users in the i-th voice (data) subgroup and the j-th carrier. $T_j$ is the total cycle time on the j-th carrier and computed in a manner analogous to the single AP, single channel case. The aggregate throughput across all the C carriers is given as, $$S = \sum_{i=1}^{C} S_i.$$

Regarding the QoS constraint imposed, we deem that the sum constraint on the resource consumption being less than unity suffices to meet the QoS requirements of the admitted calls. This inference has been verified to be true in reference [3] above. Thus, the problem of assigning users to different channels can be posed as the following optimization problem:

$$\text{minimize: } \theta_V \left(1 - \frac{1}{V} \sum_{i=1}^{M} \sum_{j=1}^{N} \alpha_{ij}\right) + \theta_D \left(1 - \frac{1}{D} \sum_{i=1}^{M} \sum_{j=1}^{N} \beta_{ij}\right)$$

$$\text{subject to: } \sum_{i=1}^{M} \alpha_{ij} \lambda_{ij}^V + \sum_{i=1}^{N} \beta_{ij} \lambda_{ij}^D \leq 1, \quad j = 1, 2, \ldots, C$$

$$w_i v_i \leq \sum_{j=1}^{C} \alpha_{ij} \leq v_i, \quad i = 1, 2, \ldots, M$$

$$u_i d_i \leq \sum_{j=1}^{C} \beta_{ij} \leq d_i, \quad i = 1, 2, \ldots, N$$

In the above formulation, we have included the blocking probability in the objective function. The blocking probabilities for the voice and data calls are $$\left(1 - \frac{1}{V} \sum_{i=1}^{M} \sum_{j=1}^{N} \alpha_{ij}\right) \text{ and } \left(1 - \frac{1}{V} \sum_{i=1}^{M} \sum_{j=1}^{N} \beta_{ij}\right),$$

respectively. The constants $\theta_V$ and $\theta_D$ are positive and can be considered as knobs for controlling the tradeoff between the voice and data call blocking probability. Finally, the constants $w_i$ and $u_i$ are the minimum fraction of i-th class voice and data user classes to be admitted, respectively. These constants can also be considered as knobs for enforcing the priority and fairness among different classes, should it be necessary. It can now be observed that we have formulated the problem of maximizing the number of admitted calls subject to QoS of admitted calls such that it can be formulated as a simple Linear Program (LP). However, since the optimization variables $\alpha_{ij}$ and $\beta_{ij}$ integer valued, we need to solve an integer LP. Although LPs can be solved very efficiently using interior point methods, it is known that solving integer LPs on the other hand is very computationally intensive. See, e.g., reference [13] above. On the other hand, in the preferred embodiments, we employ a heuristic algorithm which is described in greater detail below.

A close look at the problem formulation the present inventors have deemed that an optimal solution would be along the lines of admitting more users from groups with lower λ. This is a basis of our heuristic algorithm PACK.

It is to be noted that we could have included maximizing the throughput as part of the objective function. However, we observe that the expression for the throughput is the sum of linear-fractional functions. It is easy to see that each linear-fractional is maximized by setting all but one of $\alpha_{ij}$ or $\beta_{ij}$ zero. Non-zero weight is given to only term, the term corresponding to $$\max\left\{\frac{B_i^V}{T_i^V}, \frac{B_i^D}{T_i^D}\right\}.$$

A linear-fractional function is quasi-linear because the sub-level and the super-level sets are both convex (i.e., they are half-spaces). The sum of linear-fractional functions, however, is not necessarily convex. It is, actually, not even guaranteed to be quasi-convex. See, e.g., reference [14] above. We have experimented with the throughput maximization objective and found the results to be highly erratic; indicative of maximizing a function that is not convex (or concave). Additional comments will be provided below about the blocking probability and throughput objectives along with the presentation of numerical results.

c. Description of Our Heuristic Algorithm (PACK)

There are, among other things, two noteworthy motivations for pursuing a heuristic algorithm. First, it may not always be possible for the AP to run an optimization routine in order to perform admission control and channel assignment operations. Second, the optimization framework assumes that all calls arrive, more or less, at the same time and then that the AP needs to decide which call goes where. However, in reality, calls arrive and depart asynchronously. Thus, having a heuristic algorithm in place can potentially help in addressing real world situations. For illustrative purposes, let us continue considering the model used so far—i.e., where an AP needs to decide which user goes onto what channel. For example, consider N classes of users and N channels. Without loss of generality we assume that the classes are arranged in the descending order of individual throughput—e.g., $$\frac{B_1}{T_1^V} \leq \frac{B_2}{T_2^V} \leq \ldots \leq \frac{B_N}{T_N^V}$$

when all users are voice users. If the AP determines that all the users requesting service can be admitted, then it proceeds as follows. On the i-th channel, it allocates as many users from the i-th class as possible. When the number of users in each class is less than the single channel capacity for that class, there is no spill over traffic. In such a case, segregating different user groups as done above is same as maximizing the individual linear-fractional function in the throughput equation. When the number of users in some of the classes exceeds the single channel capacity corresponding to that class, some calls remain unassigned after this first phase of allocation. In such a case, the AP goes through the list of user classes in a sequential manner, starting from class 1. For example, if any un-assigned calls are found on channel 1, they are paired with channel consisting of users with lowest throughput (channel N). If channel N is occupied, then they are tried to be paired with channel N-1, etc. Once all calls from channel 1 are assigned, it then proceeds to channel 2 calls and tries to pair them with channels starting at N and decrementing all the way down to 1. The basic rationale behind this is that when all the users can be admitted, then the objective of interest becomes maximizing the throughput seen by the admitted users. Pairing spill over users with high throughput with those with low throughput is one method of making efficient use of resources.

Now consider that the N channels cannot accommodate all the users from all of the N classes. In this case, maximizing the number of admitted calls becomes the objective of interest. In this case, we need to consider the sorted list of user classes where the sorting is done in the ascending order of resource consumption—i.e., $\lambda_1 \leq \lambda_2 \leq \ldots \leq \lambda_N$. We start with user class 1 and assign as many of them as possible, and if all class 1 calls have been allocated, we move to class 2 calls, and so on. For example, if class 1 users pack all the N channels, users from all other classes are blocked. However, no other scheme can admit any more users. In the case when there is a constraint on minimum fraction of users to be admitted is non-zero, we can admit the minimum number of users (if feasible) in the segregation manner described above. The remaining calls are admitted so as to maximize the number of admitted calls. On a related note, one can consider channel allocation for minimizing blocking probability as being related to the multiple subset sum problem. See, e.g., reference [15] above. In the multiple subset problem, there are balls with different weights, say $g_1, g_2, \ldots, g_N$, and there are N bins all of which are of equal capacity. The problem is to maximize the weight of each of the bins without exceeding the capacity of an individual bin. Solving this problem is known to be NP-hard. Thus, the PACK algorithm is an even more attractive solution given its near optimal performance, as demonstrated in next section.

In case of asynchronous call arrivals and departures, the AP has much less flexibility. In such cases, the AP can simply admit users with same channel condition onto one channel. This is simple yet optimal when all users have identical traffic profiles. The results we provide in the numerical results can be considered to be for this case.

5. MULTIPLE ACCESS POINTS WITH MULTIPLE CHANNELS

In the case of multiple access points, the methodology described for a single AP can be applied with, e.g., the modification that all the C channels may not be available for use at each AP due to interference between the APs. This is a very realistic scenario as APs are seldom deployed by end users in an organized manner—e.g., by paying special attention to inter-cell interference and frequency reuse. An important difference between frequency reuse in cellular systems and wireless LANs is that in cellular systems, an interfering user, more or less, has the effect of raising the noise floor. In WLANs, however, if the interfering signal is received at any level above the Carrier Sense Threshold, the user infers the channel to be busy and hence refrains from transmission. Hence the WLAN user achieves zero rate during this period of time whereas the cellular user might still be able to achieve a non-zero rate.

When multiple APs are deployed in a geographical area, we present a solution whereby each AP uses only a subset of the available channels at any given time. Since an AP will be equipped with multiple channels, it will be performing carrier sense operations on each of the channels. In some preferred embodiments, we propose to use those operations to gauge the utilization of each of the channels.

For example, the AP can maintain a moving window average of the channel activity on each of the C windows where the window length is taken to be a large value, such as, e.g., 10 million slots. This illustrative example corresponds to a time of about 3.3 minutes in the case of 802.11b and about 1.5 minutes in the case of 802.11a. Generally speaking, tracking channel load for smaller windows of time may not be as useful because user arrivals and departures may occur at time scales of minutes. Nevertheless, it should not be inferred that tracking the channel load at smaller time scales (such as, e.g., even seconds) would not necessarily provide any additional benefit. Mathematically, if we represent $\rho_i$ as the loading on channel i (i=1, 2, ..., C), then during the nth slot, $$\rho_i = \left(1 - \frac{1}{T}\right)\rho_i + \frac{10^6}{T},$$

if the i-th channel is busy $$\rho_i = \left(1 - \frac{1}{T}\right)\rho_i,$$

if the i-th channel is idle

In the above averaging, T is taken to the time constant of the IIR filter used for averaging and is taken to be, e.g., $10^7$ (i.e., 10 million). The initial value of C is taken to be zero for all of the channels. In addition, a channel is said to be busy if the AP senses the channel to be busy for that slot or if it transmits during that slot. After these updates are made, the AP needs to decide which one of the 3 channels it needs to use, such as, for example, if it should use all 3 of the channels, only 2 of the channels, 1 of the channels or none. The algorithm for such a decision making can proceed, e.g., as follows:

Initially, such as, e.g., when an AP is booted, it includes all of the C channels in its usable channel set, $\Psi$. Any channel that is a member of the usable channel set can be considered for assigning to a user.

After the n-th slot,

If ($\rho_i < \Lambda$),
  Add channel i to usable channel set, i.e., $\Psi$;
Else if ($\rho_i > \Gamma$ and card ($\Psi$)>0),
  Remove channel i from set $\Psi$.

Where, $\Lambda$ and $\Gamma$ are the admission and deletion thresholds ($\Lambda < \Gamma$) that are, e.g., primarily under the network operator's control and card ($\Psi$) represents the cardinality of set $\Psi$. Qualitatively, a small value of $\Lambda$ and $\Gamma$ represents a case when, relatively, fewer channels are used, while a larger values indicates greater numbers of channels in the usable set.

Thus, after each slot, each AP can have a precise knowledge of the channels that it should be using. If the total number of channels to be used is C', then the AP can perform the optimization described in the Section entitled "Single Access Point with a Single Channel" with C replaced by C'. Some of the advantages of this approach can include that:

The set of channels to be chosen can be decided by each AP in an independent manner—e.g., the solution can be a highly distributed one.

Each AP can perform optimal call admission control locally on a set of channels it infers to be less loaded. Thus, this approach promotes harmonious resource sharing among the multiple APs.

6. ILLUSTRATIVE NUMERICAL RESULTS

We now present numerical results to demonstrate the performance of our optimal channel allocation scheme in some illustrative examples. Because, e.g., the case of multiple APs involves essentially the only additional feature of channel subset selection, analyzing the case of a single AP and multiple channels is of more significant use, at least initially. All numerical results have been obtained for the case of voice only traffic—i.e., where D=0. This choice has been to account for the condition that difference in physical data rates among users is generally the root of performance degradation in single channel WLANs. Thus, understanding those implications supersedes other objectives such as, e.g., a mixture of applications.

a. Illustrative Results for IEEE 802.11b System

We first consider an 802.11b system. Accordingly, the number of orthogonal channels can be taken to be 3. The parameter differentiating the users is the channel condition. In this exemplary study, we take 3 user classes, those that have a channel data rate of 11 Mb/s, others at 5.5 Mb/s and the rest at 1 Mb/s. To serve as a benchmark for a real world system without such optimization, we use serial admission of users onto the channels. In the following paragraphs, we will now describe the serial method in some further detail:

Serial Admission of Users (SA):

This case is considered to represent what an "ordinary" AP would do in the sense that it substantially performs only admission control based on the resources needed for an coming call and the resources remaining on a particular channel. Specifically, the procedure works, e.g., as follows: When a call request arrives, the AP computes the resources needed for this call ($\mu$) and determines if this user can be admitted onto channel 1. If the net resources consumed by users already admitted on channel 1, say, $\Sigma_1$, is such that $1-\Sigma_1 \leq \mu$, then the user is admitted onto channel 1 and $\Sigma_1$ is updated as $\Sigma_1 = \Sigma_1 + \mu$. Otherwise, it checks channel 2. And, if it fails once again, then it checks channel 3. If the user is not admitted to any of the 3 channels, the call is taken to be blocked call.

From the above, it can be appreciated that the order of arrivals is of importance. For example, if a lot of 1 Mb/s users arrive into the system before anyone else, they can occupy most of the resources that the channels can spare, thus blocking the higher rate users that arrive later. For the same population size and user distribution (e.g., for numbers of 11, 5.5 and 1 Mb/s users), the blocking probability can vary. Thus, in an illustrative simulation, we generate 10,000 random arrival patterns of users, for the same user distribution and compute the blocking probability as the average of 10,000 values. Similarly, we measure the throughput from each random arrival pattern of users and take the average of 10,000 such values.

The optimal allocation policy can be obtained by solving the integer LP described in Section 4 above using, e.g., a CPLEX optimization tool. To compare the performance of different assignment strategies, we have considered different loading scenarios. For example, an illustrative scenario identified as [35 35 35] indicates that there are 35 users each at data rates of 11 Mb/s, 5.5 Mb/s and 1 Mb/s. These users, totaling 105 voice users, are requesting admission onto the 3 channels at AP's disposal. The $\lambda$ values for these three classes of users came to 0.032, 0.0392 and 0.104 for the ITU 4 state Markov model, G.711 codec and 30 ms packetization interval. With these values of $\lambda$, the capacity of each class of users (assuming, e.g., no other class of users is present) comes to 31, 25 and 9, respectively. Thus, on a single channel, e.g., 31 simultaneous voice calls can be supported when the voice users have a physical data rate of 11 Mb/s; or, e.g., 25 and 9 simultaneous calls can be supported when the physical data rate is 5.5 Mb/s and 1 Mb/s, respectively.

If one considers serial admission of users for this loading scenario, we find that on average, we can achieve a blocking probability as high as, e.g., about 51%. The corresponding throughput came to 6.4 Mb/s in the exemplary studies. Notably, although in such an example, there are 35 users, the illustrative model assumes that each one of these users is talking with a node in the wired network. Thus, each wireless user preferably corresponds to two data streams, one from wired to wireless and the other from wireless to wired. This multiplication by 2 is taken into consideration when calculating the throughput. By comparing the throughput of SA to the optimal strategy we note that not only does SA have about a 73% higher blocking probability, but it suffers a throughput penalty. The optimal scheme achieves lower blocking probability while simultaneously achieving approximately 47% higher throughput.

Figure 3:
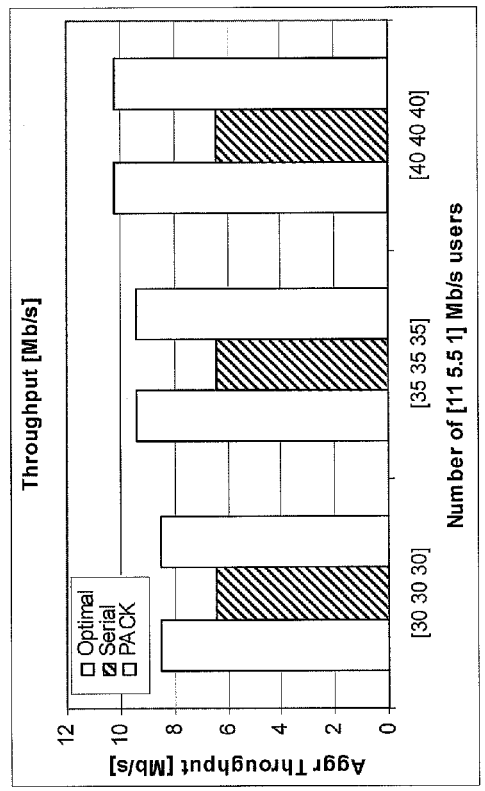
FIG. 3 is a chart depicting an illustrative throughput comparison of optimal, serial and PACK strategies for 802.11b.
Figure 4:
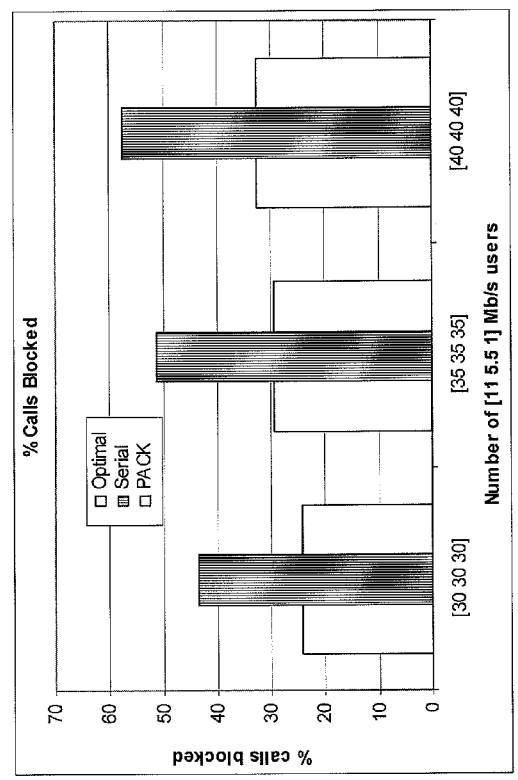
FIG. 4 is a chart depicting an illustrative comparison of blocking probability for optimal, serial and PACK schemas for 802.11b.

FIGS. 3 and 4 summarize these exemplary results. In particular, FIG. 3 shows a throughput comparison of optimal, serial and PACK strategies for 802.11b, and FIG. 4 shows a comparison of blocking probability for optimal, serial and PACK schemes for 802.11b.

We initially note that the preferred PACK algorithm achieves throughput and blocking probability substantially akin to that obtained by the optimal policy. FIG. 3 shows, e.g., the aggregate throughput over all the three channels for the three loading scenarios of [30 30 30], [35 35 35] and [40 40 40]. There, it can be seen that the throughput in all of the three cases is saturated to 6.4 Mb/s for the SA scheme. The reason why the throughput has saturated without reducing is that even in the SA scheme, we are preferably performing admission control. No users are admitted once the net resource consumption approaches unity.

Over these loading regimes, the throughput of the optimal scheme is approximately 60% higher than SA scheme with randomized arrivals. The next metric of interest is the blocking probability, depicted in FIG. 4. Once again, the SA scheme achieves, e.g., as much as about 75% higher blocking probability than the optimal scheme. These results clearly demonstrate, e.g., the value of pooling users based on channel quality, such as can be done by the PACK algorithm.

Figure 5:
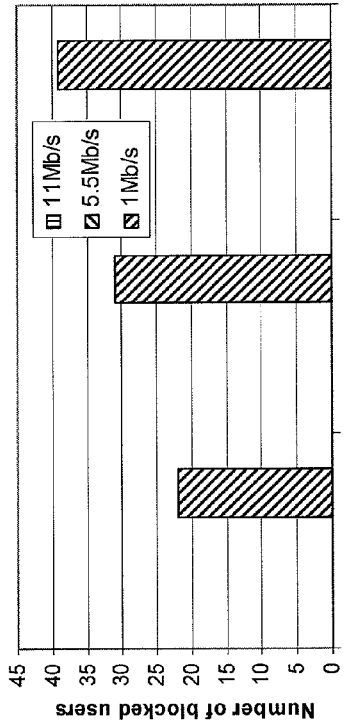
FIG. 5 is a chart depicting an illustrative number of blocked users by type in 802.11b for optimal and PACK.

We now consider the number of blocked users by channel type. FIG. 5 plots the number of blocked users as obtained by solving the integer LP. Specifically, FIG. 5 depicts a number calls blocked by type in 802.11b—for Optimal and PACK. As depicted, users with a higher $\lambda$, which in this case translates to lower channel data rates, are the ones that are blocked the most. For all the three loading cases, PACK obtained substantially identical channel assignment as optimal. Accordingly, it is demonstrated that a maximum number of calls can be admitted when we choose users with best channel conditions.

Figure 6:
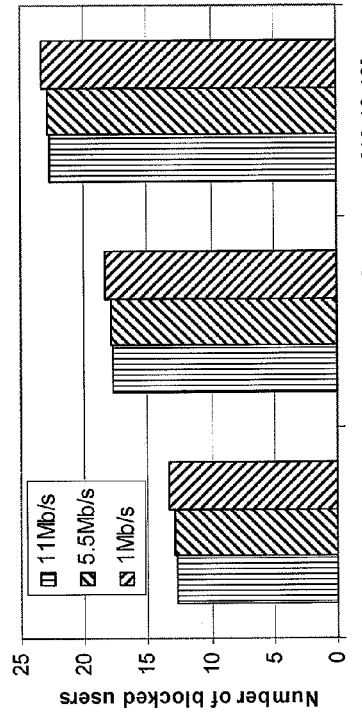
FIG. 6 is a chart depicting an illustrative number of blocked users by type in 802.11b for serial allocation.

In the case of SA, as shown in FIG. 6, because no disparity is shown towards different user classes, all classes experience the same number of blocked calls. Specifically, FIG. 6 shows a number of blocked calls by type in 802.11b—for Serial Allocation. Further, the number of calls to be admitted remains substantially constant for a given channel capacity. Thus, as the load increases, the number of blocked calls increases by essentially the same amount. For example, each bar in FIG. 6 increases by 5 when we go from [30 30 30] to [35 35 35]. Regarding throughput versus blocking probability comparison, although one might contend that higher throughput for optimal and PACK is a consequence of a higher number of users being admitted, the fact that a larger number of users with better channel conditions are admitted achieves superior performance.

Figure 7:
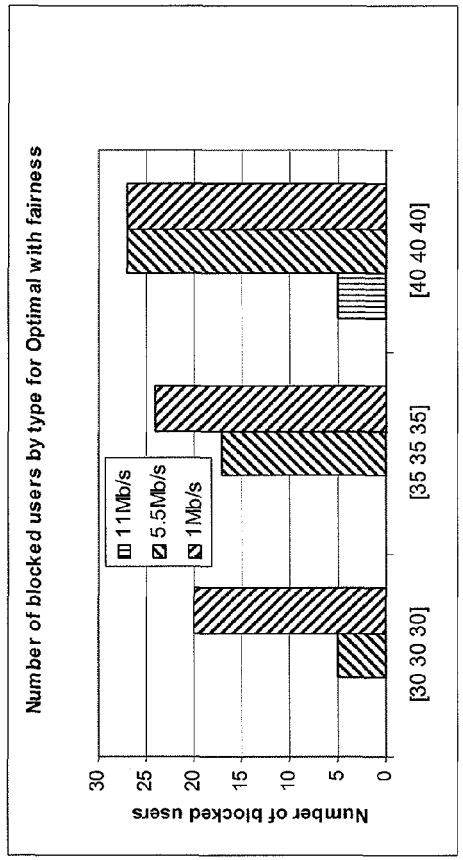
FIG. 7 is a chart depicting an illustrative number of blocked calls by type for an optimal scheme when a minimum fraction of calls to be admitted in each class is set to one third (⅓)

The foregoing results were based on the assumption that the minimum fraction of users admitted in any class is set to zero. This is a reason why, e.g., the number of blocked calls is very high for the 1 Mb/s users. Toward that end, we can consider changing the constraint on the minimum fraction of users to be admitted ($w_i$ in our formulation) to, e.g., ⅓ for all users. The resulting number of blocked calls by type for the optimal policy is shown in FIG. 7. Specifically, FIG. 7 depicts a number of blocked calls by type for an optimal scheme when the minimum fraction of calls to be admitted in each class is set to ⅓. As demonstrated, users other than 1 Mb/s get blocked as well. However, it is noted that the optimal policy only admits the minimum number of low rate users and admits as many remaining high rate users as possible. Moreover, in contrast to the increasing aggregate throughput when $w_i=0$, the throughput actually declined from 8.1 Mb/s to 8 Mb/s to 7.6 Mb/s when loading changed from [30 30 30] to [35 35 35] to [40 40 40]. This effect is can be explained by a greater fraction of users with low data rates being admitted into the system.

b. Illustrative Results for an IEEE 802.11a System

In this section, we now present illustrative results for an IEEE 802.11a system. As mentioned before, the 802.11a standard allows us to have 12 channels. Further, the number of data rates used is 8 in 802.11a, as compared to 3 in 802.11b. As some examples, we provide results for the case when only 8 of the 12 channels are used. The 8 different data rates supported in the 802.11a system include 6, 9, 12, 18, 24, 36, 48 and 54 Mb/s. The single channel voice capacities corresponding to those data rates are 51, 69, 81, 100, 113, 130, 142 and 145, respectively. Here, we can define the following three loading scenarios for 802.11a.

Scenario A:
In which the number of users for each data rate corresponds to the single channel capacity with that rate (e.g., the loading vector is [51,69,81,100,113,130,142,145]).

Scenario B:
In which the number of users for each data rate is equal to 145.

Scenario C:
In which the number of users for each data rate is equal to 200.

Figure 8:
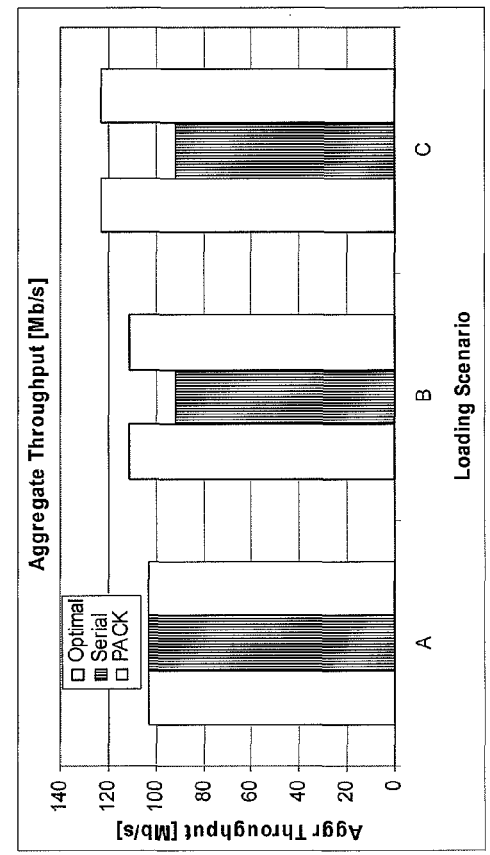
FIG. 8 is a chart depicting an illustrative aggregate throughput across all channels in an eight (8) channel IEEE 802.11a system.
Figure 9:
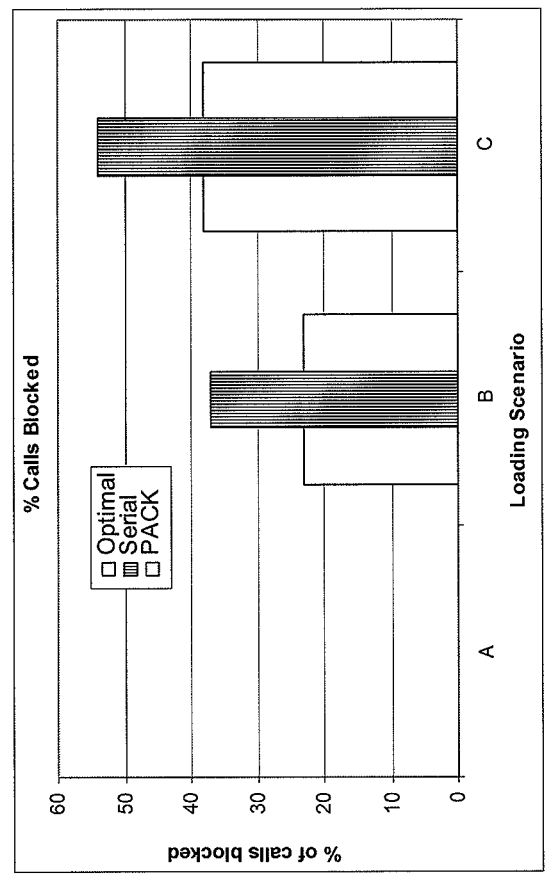
FIG. 9 is a chart depicting an illustrative blocking probability as a function of loading in an 8 channel 802.11a system.

The results for each of these scenarios are shown in FIGS. 8 and 9. Specifically, FIG. 8 depicts an aggregate throughput across all channels in an 8 channel IEEE 802.11a system, and FIG. 9 depicts a blocking probability as a function of loading in an 8 channel 802.11a system.

First, once again, it can be seen that the PACK algorithm achieves a performance that is almost identical to that of the optimal. In addition, when loading is such that the number of users corresponding to a data rate is equal to the single channel capacity for that data rate (e.g., Scenario A), the order of arrivals does not necessarily matter. This means that SA, optimal and PACK can all achieve the same performance. This can be explained as follows. If one compares the of admission users onto channels as a bin packing problem, then for fixed bin and ball sizes (e.g., where different balls can be of different sizes but where they all need to be small), one can pack the bins regardless of the order in which the balls are chosen, provided the total number of balls are do not exceed the total capacity of the bins.

Next, as we proceed to higher loading scenarios, we see that SA starts to suffer a throughput penalty while the optimal and PACK strategies actually see an increase in throughput. A rationale for this drop can be appreciated by noting that the number of users with low channel rates increases from scenario A to B to C. Because the capacity of a channel is fixed, the probability of these low rate users (e.g., high resource consumers) arriving ahead of high rate users increases. Thus, a greater number of low rate users are admitted, blocking a higher number of high rate users. SA scheme admits all users uniformly, whereas optimal strategy accepts greater fraction of users with better channel conditions. The same concept extends to the case when, e.g., 200 users are taken from each data rate.

The number of users admitted in each data rate for each of the three scenarios was consistent with 802.11b results. It was demonstrated that SA essentially blocks all users uniformly whereas optimal and PACK block most of the low data rate users. Notably, unlike in 802.11b, the PACK assignments for 802.11a were slightly different from optimal assignments resulting in blocking about a total of 3 to 4 users more than optimal.

c. Illustrative Results for IEEE 802.11g Co-Existing with IEEE 802.11b

As described above, an IEEE 802.11g system operates in the ISM band and should be backward compatible with 802.11b devices. In the absence of 802.11b terminals, 802.11g users can use the OFDM specification without using any protection mechanisms. The performance and call carrying capacity of an IEEE 802.11g only system is, hence, substantially identical to that of an 802.11a system. Accordingly, the results presented herein for an 802.11a system apply substantially identically to an 802.11g only system. However, the situation is different when one considers mixed 802.11b and 802.11g scenarios because, e.g., of the two protection schemes described above.

For illustration purposes, we consider the case where there is one group of 802.11b users, all members of which are at 11 Mb/s and engaging in voice communication with a node on a wired network, and, in addition to this group of 802.11b users, there are two groups of 802.11g users. In this example, the first group of 802.11g users consists of 145 users, all of which use CTS-to-Self protection mechanism. On the other hand, the second group consists of 145 users, all of which use RTS-CTS cycle. The number 145 is chosen in this example because it is the single carrier voice capacity of an 802.11g only system. Similarly, thirty one 802.11b users correspond to the single user capacity with 11 Mb/s. The 802.11g system with CTS-to-Self can support 57 voice calls, whereas it can support only 41 calls when RTS-CTS protection is used. These numbers directly reflect that when 802.11b and 802.11g co-exist, the effective time needed for getting an 802.11g packet across increases significantly, especially for the RTS-CTS protection context. In this case, grouping users results in all of the 802.11b users being assigned to one channel, all of the 802.11g CTS-to-Self users being assigned to the second channel, and all of the 802.11g-RTS-CTS users being assigned to the third channel. Now, since there is no 802.11b user in either of the second and third channels, the 802.11g users need not use CTS-to-Self or RTS-CTS procedures. Accordingly, we can support all of the 145 users in each of the channels. Since thirty one 802.11b users can be supported by a single channel too, we find that grouping achieves a zero blocking probability. The corresponding throughput came to be approximately 40 Mb/s.

If one were to use the SA strategy, the blocking probability would be seen to be close to about 60% while the throughput is just about 17 Mb/s. This exercise shows how grouping users can cause cascaded effects in terms of performance gains. The fact that 802.11b and 802.11g users can be separated out based on their resource consumption, has led to the indirect gain of fully utilizing the high speed capabilities of the 802.11g system.

7. ILLUSTRATIVE CALL SETUP ISSUES

We now describe two possible methods that can be used by the AP and mobile in order to admit a user onto the appropriate channel. The first method does not require any standards support while the second method assumes some changes can be made to 802.11 management messages.

Direct Association:

The station measures the SNR (signal-to-noise ratio) on each of the C channels using the beacons transmitted by the AP. It orders the channel numbers in the descending order of SNR. It transmits an association message on the strongest channel (without indicating the other channel qualities or the traffic type/characteristics). If an association response is not received, it tries the next channel in the order, and so on. The AP will send an association response upon receiving an association request as long as the total resource consumption on the current channel is less than unity. The station will start sending and/or receiving traffic if it was successfully admitted onto one of the C channels. At this stage, if the station is engaged in a voice call, the AP can parse the SIP signaling messages to get information such as codec type, interval size, etc. Similarly, for data traffic it can determine the MSS (maximum segment size) used by TCP. Using these parameters, the AP can determine the resources consumed by this call. In addition, preferably using the optimization approaches described herein, it can determine the correct channel for this station. Upon deciding this, it will preferably either continue to keep the user on the current channel, or, de-associate the station from the current channel and send an Association Response only when this station sends an Association Request on the correct channel.

One potential drawback of this approach can be latency in call setup. The station may need to try each of the channels sequentially, at two times: a first time for the AP to obtain the traffic information and a second time for being assigned to the correct channel, given that the AP has all the information it needs to optimally assign this user to a channel. In the case of 802.11b, since there are only 3 channels, the latency may not be that high as compared with 802.11a which has 12 channels. However, since the latency is in the call setup phase only, it may be an attractive solution that can avoid imposing changes to standard message formats.

Association Using a Measurement List:

A station that needs system resources can monitor the beacons on different channels by tuning into each of the C channels and selecting the AP corresponding to the strongest received beacon. It can then send an Association Message to the AP on that channel. The AP receives the Association Message and by using the Signal Strength Measurement (for all the C channels) and the traffic class (e.g., Voice, Data) sub-fields inside that message, determines whether to admit the user onto that channel or not. Notably, the 802.11 standard association messages would need to be modified to support such decision-making. In this regard, if the AP decides to admit the user on the same channel, it will preferably say so in the Association Response message. If, however, the AP decides to admit the user onto another channel, it will preferably indicate the corresponding channel in the Association Response message.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A system for improving the aggregate throughput of a wireless local area network, comprising:
   a) at least one access point that is equipped with at least one transceiver configured to simultaneously transmit and receive using multiple channels (C);
   b) said at least one access point being configured to acquire channel conditions of respective wireless mobile users, including said access point being aware of application traffic of said respective wireless mobile users and determining resource consumption needed for said respective users,
   c) said at least one access point being configured to pool sets of users on said channels based on said channel conditions of said respective wireless mobile users, using a heuristic algorithm including
      i) grouping said wireless mobile users into classes, with wireless mobile users having similar channel conditions being assigned to a specific one of said classes and with said classes being ranked based on resource consumption;
      ii) assigning each of said classes to respective ones of said channels, with some users of a higher ranked class being assigned to a channel assigned to said higher ranked class and with some users of said higher ranked class being assigned to share another channel assigned to a lower ranked class;
   d) said access point being configured to assign channel access to users of a higher ranked class prior to users of a lower ranked class, such that when all available channels cannot accommodate all users, some users of said lower ranked class are not admitted channel access; and
   e) when said users can be admitted, said access point being configured to allocate on each channel as many users from a respective class as possible, including that when the number of users in said respective class is less than the channel capacity for that class, there is no spill-over traffic of calls, and all said users in said respective class are allocated to that channel.

2. The system of claim 1, wherein said at least one access point has a single radio that is configured to dynamically change the operating frequency.

3. The system of claim 1, wherein said access point is configured to dynamically modify a set of said channels available for assigning wireless mobile users by periodically determining if a channel may be interfered by another access point and removing channels that may be interfered from selection.

4. The system of claim 1, wherein the system includes user terminals configured for at least two different networking specifications, and wherein users for a first of said networking specifications are assigned to a first class placed on a first channel and users for a second of said networking specifications are assigned to a second class placed on a second channel.

5. The system of claim 4, wherein said at least two networking specifications include IEEE 802.11g and IEEE 802.11b networking specifications.

6. The system of claim 1, wherein said at least one access point is configured to respond to association requests from user stations configured to send or receive on only one of said channels at a given time, wherein said user stations are at differing locations and are capable of using different channel rates.

7. The system of claim 6, wherein said stations are in conversation with nodes in a wired network.

8. The system of claim 1, wherein said access point is configured to enable voice traffic.

9. The system of claim 1, wherein said access point is configured to enable packet data traffic.

10. The system of claim 1, wherein:
    a) the access point is configured to separate users into a number of classes of users having respective levels of throughput;
    b) when the users can be admitted, the access point is configured to allocate said users to said channels as follows:
       i) on each channel, the access point allocates as many users from a respective class as possible, further including that when the number of users in a class is more than the channel capacity for that class, there is spill-over traffic of calls, which calls are further assigned by the access point going through said classes in a step-wise manner starting at a higher throughput class so as to pair spill-over traffic having a higher throughput with that having a lower throughput.

11. The system of claim 1, wherein:
    a) the access point is configured to separate users into a number of classes of users with different levels of throughput;
    b) if the access point cannot accommodate all users, then the access point is configured to allocate users by going through user classes in a step-wise manner starting at a higher throughput first class, assigning as many of such users as possible, then moving onto a next class and then to subsequent classes.

12. The system of claim 1, wherein said access point is configured to handle asynchronous calls by admitting only users with similar channel conditions onto corresponding ones of said channels.

13. The system of claim 1, wherein in circumstances in which said access point receives external interference related to the presence of additional access points, said access point is configured to gauge the utilization of each of the channels and to establish a subset of said channels to be chosen.

14. The system of claim 13, wherein said access point is configured to maintain a moving window average of the channel load activity on each of the channels.

15. The system of claim 1, wherein said at least one access point includes an access point that has one transceiver that can simultaneously transmit and receive or two or more transceivers to enable simultaneous transmitting and receiving.

16. The system of claim 1, further including said access point receiving association messages from a wireless mobile user over a plurality of channels in succession, and said access point transmitting an association response upon receiving an association request on one of said channels as long as the total resource consumption on said one of said channels is below a specific value.

17. The system of claim 16, wherein said access point is configured such that upon the access point admitting the wireless mobile user to a channel, said access point monitors traffic of said wireless mobile user and determines resources consumed by the user, and based thereon said access point determining a correct channel for said wireless mobile user.

18. The system of claim 17, wherein said access point is configured such that upon determining that a correct channel for said wireless mobile user is different from the current channel, said access point de-associates said wireless mobile user from the current channel and sends an association response only after the wireless mobile user sends a new association request on the correct channel.

19. The system of claim 16, further including:
  a wireless mobile user being configured to measure signal to noise ratio on each of said channels (C) using beacons transmitted by said access point, and to transmit association messages to said access point starting on the strongest channel until the access point sends an association response back to said wireless mobile user.

20. The system of claim 1, further including said access point being configured to receive an association message from a wireless mobile user, which message includes signal strength measurements of channels for that wireless mobile user and traffic class data, and configured to determine based thereon whether to admit the user onto the channel.

21. The system of claim 20, further including said access point being configured such that upon determining that a correct channel for said wireless mobile user is different from the current channel, said access point sends an association response to said wireless mobile user indicating a correct channel within the association response message.

22. The system of claim 1, wherein said classes include classes based on traffic type, including at least one voice traffic class and at least one data traffic class.

23. A method for improving performance of a wireless local area network, comprising:
  a) having an access point simultaneously transmit and receive communications on multiple channels;
  b) segregating users accessing said access point onto different ones of said channels based on differences in strengths of the users' channel conditions using a heuristic algorithm including grouping said users into classes, with users having similar channel conditions being assigned to a specific one of said classes and with said classes being ranked based on resource consumption;
  c) assigning each of said classes to respective ones of said channels, with some users of a higher ranked class being assigned to a channel assigned to said higher ranked class and with some users of said higher ranked class being assigned to share another channel assigned to a lower ranked class; and
  d) assigning channel access to users of a higher ranked class prior to users of a lower ranked class, such that when all available channels cannot accommodate all users, some users of said lower ranked class are not admitted channel access; and
  e) when said users can be admitted, the access point allocating on each channel as many users from a respective class as possible, including that when the number of users in said respective class is less than the channel capacity for that class, there is no spill-over traffic of calls, and all said users in said respective class are allocated to that channel.

24. The method of claim 23, further including having said access point dynamically modify a set of said channels available for assigning wireless mobile users by periodically determining if a channel may be interfered by another access point and removing channels that may be interfered from selection.

25. The method of claim 23, including having said classes include classes based on traffic type, including at least one voice traffic class and at least one data traffic class.

* * * * *